March 27, 1928.

J. F. O'CONNOR 1,664,313

FRICTION SHOCK ABSORBING MECHANISM

Original Filed Sept. 4, 1925   2 Sheets-Sheet 1

March 27, 1928.
J. F. O'CONNOR
1,664,313
FRICTION SHOCK ABSORBING MECHANISM
Original Filed Sept. 4, 1925   2 Sheets-Sheet 2
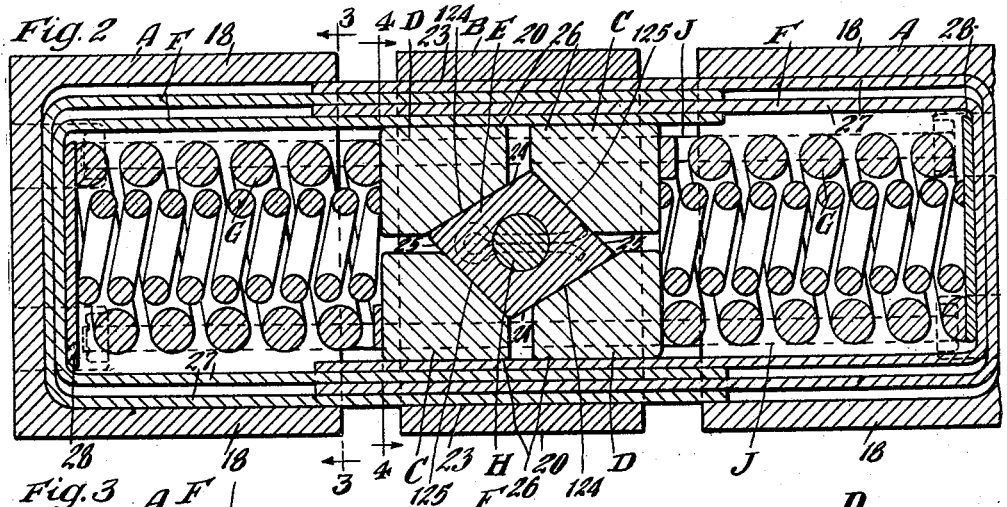
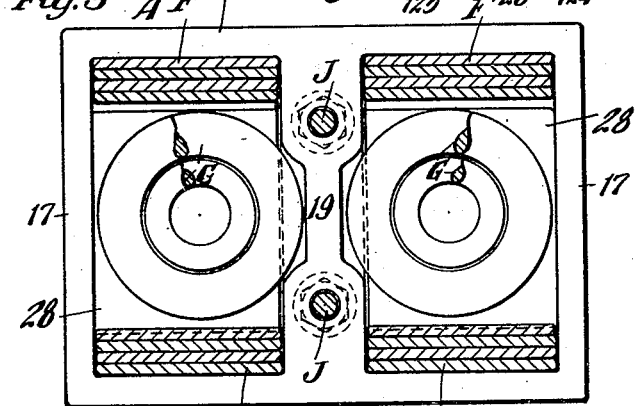
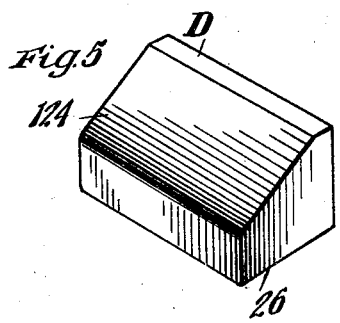
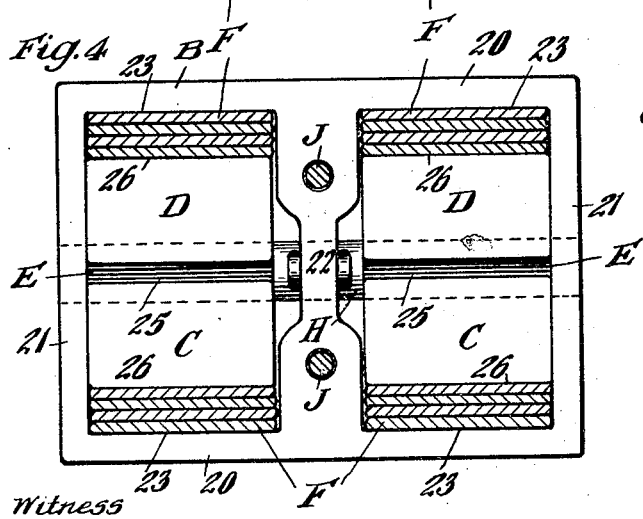
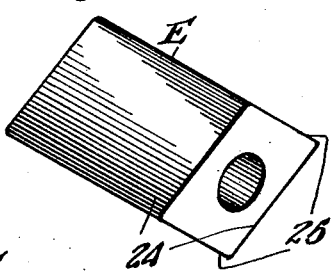
Witness
Wm. Geiger
Inventor
John F. O'Connor
By George I. Haight
His Atty.

Patented Mar. 27, 1928.

1,664,313

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed September 4, 1925, Serial No. 54,417. Renewed November 28, 1927.

This invention relates to improvements in friction shock absorbing mechanisms.

One object of the invention is to provide a friction shock absorbing mechanism, more particularly adapted for railway draft riggings, wherein is obtained high capacity due to relatively large frictional areas provided by a plurality of co-acting friction elements including a readily replaceable element adapted to take the principal wear.

Another object of the invention is to provide a mechanism of the character indicated, of the double ended type, including a spreading means for placing the friction elements under lateral pressure when the spreading means is compressed, composed of wedge elements and friction shoes co-operating with the opposite ends thereof, the spreading means being so designed as to effect quick and certain release upon reduction of the actuating forces.

More specifically, an object of the invention is to provide a friction shock absorbing mechanism of the intercalated plate type, wherein is employed a replaceable friction shell which takes the wear independently of the follower elements, thereby greatly reducing the cost of replacement.

Other objects and advantages of this invention will more fully and clearly appear from the description and claims hereinafter following.

In the drawings forming a part of this specification, Figure 1 is a horizontal, longitudinal, sectional view of a portion of a railway draft rigging showing my improvements in connection therewith. Figure 2 is a vertical, longitudinal, sectional view partly broken away, corresponding substantially to the line 2—2 of Figure 1. Figures 3 and 4 are vertical, transverse, sectional views corresponding respectively to the lines 3—3 and 4—4 of Figure 2. And Figures 5 and 6 are detailed, perspective views respectively of a friction wedge shoe and a wedge member used in connection with my improved mechanism.

In said drawings, 10—10 indicate channel-shaped center or draft sills of a railway car underframe, to the inner faces of which are secured front stop lugs 11—11 and rear stop lugs 12—12. The inner end portion of the draw-bar is designated by 13, to which is operatively connected a hooded yoke 14 of well-known form. The shock absorbing mechanism proper is disposed within the yoke and the yoke is in turn supported by a detachable saddle plate 15 secured to the draft sills.

The improved shock absorbing mechanism proper, as shown, comprises broadly front and rear follower casings A—A; a central friction shell B; four friction shoes C and four friction shoes D; two wedge blocks E—E; four sets of friction elements F—F; front and rear pairs of twin arranged spring resistance elements G—G; a retaining pin H; and a pair of retainer bolts J—J.

The front and rear follower casings A are of substantially the same design, each casing including a transverse vertical end wall 16, longitudinally disposed, spaced, vertical side walls 17—17, horizontally disposed spaced top and bottom walls 18—18, and a central, vertically disposed, longitudinal, partition wall 19. The partition wall 19 divides each casing into two chambers within which are accommodated the corresponding friction elements F and one of the twin spring resistance elements G. The transverse end walls 16 of the respective follower casings A co-operate with the corresponding stop lugs in the manner of the usual followers.

The friction shell B is in the form of a rectangular casing having horizontally disposed top and bottom walls 20—20, vertically disposed spaced side walls 21—21, and a central partition wall 22 divides the shell into two compartments. The top and bottom walls 20 present longitudinally disposed interior friction surfaces 23 adapted to co-operate with the corresponding friction elements F.

The wedge blocks E are two in number, and are disposed within the shell B and arranged at opposite sides of the partition wall 22 thereof. The two blocks E are of like construction, each being provided with two pairs of wedge faces 24—25 and 24—25 at the opposite ends thereof. Each pair of wedge faces 24—25 converges outwardly of the mechanism and the wedge face 24 is disposed at a relatively keen wedge-acting angle with reference to the longitudinal axis of the mechanism while the wedge face 25 is disposed at a relatively blunt releasing angle with reference to said axis. As most clearly shown in Figure 2, the keen wedge face 24 at the front end of each wedge block E is arranged at the top of the block while the keen wedge face 24 at the rear end of the block is arranged at the bottom thereof. It will thus be seen that the blunt and keen wedge faces of each set are directly opposed to each other. The wedge blocks E are fixed to the friction shell B by means of the transversely disposed pin H, the two blocks, the central partition wall 22 and the side walls 21 of the shell B being provided with alined openings adapted to accommodate the pin. To prevent lateral displacement of the pin, two cotter pins are employed which are disposed at opposite sides of the partition wall 22 and extend through suitable openings in the retaining pin H.

The friction wedge shoes C and D which are eight in number, are of substantially the same design except as hereinafter pointed out. The friction shoes are arranged in groups of four, at opposite sides of the partition wall 22, each group comprising two sets C and D. One set of shoes C and D co-operates with the front end of the corresponding wedge member E, while the other set of shoes C and D co-operates with the rear end thereof. Each of the shoes has a longitudinally disposed outer friction surface 26 and a wedge face on the inner side thereof, the wedge faces of the shoes C being designated by 125 and those of the shoes D being designated by 124. The wedge faces 125 of the shoes C are inclined at a relatively blunt angle with reference to the longitudinal axis of the mechanism and co-operate with the corresponding blunt wedge faces 25 of the wedges E. The wedge faces 124 of the shoes D are disposed at a relatively keen wedge acting angle and co-operate with the wedge faces 24 of the wedge blocks E.

The friction elements F comprise four sets, two sets being associated with each casing, one set being disposed in each compartment thereof. The friction elements F are all of like design, each being in the form of a U-shaped member having spaced, opposed longitudinally extending plate-like arms 27. As most clearly shown in Figure 2, each set of friction elements comprises two members, the plate-like arms 27 of each set associated with one follower being alternated with the plate-like arms of the corresponding set of the other follower. The plate-like members of the friction elements provide two pairs of groups of friction elements, disposed at the top and bottom of the mechanism respectively. The plate-like sections 27 of the two groups disposed at the top of the mechanism co-operate with the corresponding friction shoes C and D, and form part of the innermost friction elements F carried by the front follower casing while the innermost arms 27 of the lower groups of friction plates co-operate with the friction shoes C and D at the bottom of the mechanism and form parts of the inner friction elements F associated with the rear follower casing. The arms 27 at the bottom of the mechanism of the outermost friction elements F associated with the front follower casing co-operate with the friction surface 23 at the bottom of the friction shell B, while the arms 27 at the top of the mechanism of the outermost friction elements F associated with the rear casing A co-operate with the friction surface 23 at the top of the shell B.

The spring resistance elements G are arranged in pairs at opposite ends of the mechanism, within the chambers of the corresponding follower casings. Each member of the spring resistance elements comprises an inner relatively light coil and a heavier outer coil having their opposite ends bearing respectively on the friction shoes C and D at the corresponding end of the mechanism and a spring follower plate 28 bearing on the transverse section of the innermost U-shaped friction element in the corresponding follower chamber.

The mechanism is held of overall uniform length and under initial compression by the retainer bolts J. The retainer bolts J are preferably two in number and are arranged at the top and bottom of the mechanism having their opposite ends anchored to the front and rear follower casings respectively and the shanks thereof extending through alined openings in the partition walls 19 of the follower casings A and the partition wall 22 of the friction shell B. Compensation for wear of the various friction and wedge faces is had by the expansion of the spring resistance elements J which, as pointed out, are under initial compression.

The operation of my improved shock absorbing mechanism, assuming a compression stroke, is as follows: The front and rear follower casings A will be moved relatively toward each other, thereby compressing the spring resistance elements G, the latter transmitting the actuating force to the wedge friction shoes C and D, and forcing the same against the wedge faces of the wedge block E. A spreading action will thus be obtained, placing the friction plate members 27 of the top and bottom groups under lateral compression and forcing the same into intimate contact with the corresponding friction surfaces of the shell B. During the relative approach of the follower casings A, the friction elements will be forced to move therewith, relatively to each other, the arms 27 of the sets associated with one follower slipping on the arms 27 of the sets associated with the other follower. This action will continue either until the actuating pressure is reduced or the inner ends of the casings A come into engagement with the opposite ends of the shell B, whereupon the pressure will be transmitted through the casings A and the shell B directly to the stop lugs, thereby relieving the springs G from excessive pressure. As the mechanism is being compressed, there will be a true wedging action between the co-operating keen wedge faces of the friction wedge shoes and the wedge blocks while there will be substantially no true wedging action between the co-operating blunt faces of the shoes and blocks. Owing to the curved corners of the elements F, slight resiliency is provided which is of a capacity much greater than the elements G. On release, this stored energy produces initial release, after which the springs G come into effective action.

When the actuating force is reduced, the springs G will act to return all of the parts to normal position. Inasmuch as the outer ends of the springs G bear on the transverse sections of the U-shaped friction elements, the spring will act to positively restore the plates to normal position. Due to the relatively blunt co-operating faces on the wedge blocks and friction shoes, the wedge blocks will be squeezed out from between the friction shoes, thereby relieving the pressure on the co-operating keen faces thereof and greatly facilitating release of the mechanism. In addition to facilitating release of the mechanism, the blunt and keen angle arrangement of co-acting wedge faces also effectively prevents the sticking of the elements of the wedge system, inasmuch as the blunt faces act in the manner of a "safety valve."

It will be evident that my invention is not limited to the arrangement of blunt and keen wedge faces, but that it is within the scope of the invention to dispose all of said wedge faces at the same angle with reference to the longitudinal axis of the mechanism.

It will also be evident that by providing the replaceable friction shell which is disposed intermediate the front and rear followers which takes practically all of the wear due to the action of the friction plates, the repair of the gear is greatly facilitated, and the cost of repairs reduced, inasmuch as it is only necessary to replace the worn shell by a new one.

While I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with front and rear movable followers; of a wedge block having wedge faces at the opposite ends thereof; friction shoes at the opposite ends of said wedge, having wedge faces cooperating with the faces of said block; a friction member interposed between said followers; relatively movable friction elements interposed between said shoes and friction member, said elements being engaged by and moved relatively to each other by said followers; and spring resistance means interposed between said followers and shoes and opposing relative movement of said follower and shoes.

2. In a friction shock absorbing mechanism, the combination with front and rear followers, said followers being movable relatively toward and away from each other; of a friction member interposed between said followers; a wedge fixed to said member; wedge friction shoes co-operating with the opposite ends of said wedge; longitudinally disposed friction elements between said followers and engaged by said followers to effect relative movement thereof, said friction elements being interposed between said shoes and friction member; and yielding means resisting relative movement of said followers and shoes.

3. In a friction shock absorbing mechanism, the combination with front and rear, relatively movable follower elements; of a friction shell interposed between said follower elements, said shell having interior friction surfaces; a wedge member carried by said shell; front and rear sets of friction shoes co-operating with said wedge member; a group of friction elements at opposite sides of the mechanism, each group comprising front and rear sets of elements movable respectively with the front and rear followers; and a spring resistance interposed between each follower and the corresponding set of friction shoes.

4. In a friction shock absorbing mechanism, the combination with front and rear follower casings; of a friction shell interposed between said casings, said shell having interior friction surfaces; a wedge member carried by the shell; friction shoes co-operating with the opposite ends of said wedge; friction elements movable with the front and rear casings, said elements being interposed between the shoes and the friction surfaces of the shell; and spring means resisting relative approach of said shells and co-operating with the shoes.

5. In a friction shock absorbing mechanism, the combination with front and rear follower casings relatively movable toward and away from each other; of a friction shell interposed between the casings, said shell having opposed interior friction surfaces; a central wedge fixed to the shell, said wedge having a pair of wedge faces at each end; a pair of friction shoes at each end of the wedge having wedge faces cooperating with the corresponding faces of the wedge; friction elements carried by each casing and movable therewith, the friction elements of one casing being alternated with the friction elements of the other casing, said elements comprising two groups disposed at opposite sides of the mechanism, each group being interposed between one of the friction surfaces of the shell and the friction shoes at the corresponding side of the mechanism; and spring resistance elements within each follower casing engaging the shoes at the corresponding end of the wedge.

6. In a friction shock absorbing mechanism, the combination with relatively movable front and rear follower casings; of a friction shell interposed between said casings, said shell having interior friction surfaces; a plurality of groups of relatively movable intercalated plates co-operating with said shell friction surfaces and adapted to be moved relatively to each other by said follower casings; a pair of friction shoes co-operating with each group of plates, one shoe of each pair having a blunt wedge face and the other shoe of said pair having a keen wedge face; a wedge block co-operating with each shoe and having a blunt wedge face at one end thereof co-operating with the blunt faced shoe of one of said pairs and a keen wedge face at the other end thereof co-operating with the keen faced shoe of said pair; and means for yieldingly resisting relative movement of the casings.

In witness that I claim the foregoing I have hereunto subscribed my name this 28th day of August 1925.

JOHN F. O'CONNOR.